US012386352B2

(12) United States Patent
Hsu et al.

(10) Patent No.: US 12,386,352 B2
(45) Date of Patent: Aug. 12, 2025

(54) MOVING VEHICLE AND POSITIONING METHOD USED FOR MOVING VEHICLE

(71) Applicant: Wistron Corporation, New Taipei (TW)

(72) Inventors: Yu Hung Hsu, New Taipei (TW); Hung Chou Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 228 days.

(21) Appl. No.: 18/449,682

(22) Filed: Aug. 14, 2023

(65) Prior Publication Data
US 2025/0021094 A1  Jan. 16, 2025

(30) Foreign Application Priority Data

Jul. 12, 2023  (TW) .................................. 112126029

(51) Int. Cl.
G05D 1/00 (2024.01)
(52) U.S. Cl.
CPC ......... *G05D 1/0212* (2013.01); *G05D 1/0238* (2013.01); *G05D 1/0257* (2013.01)

(58) Field of Classification Search
CPC ... G05D 1/0212; G05D 1/0238; G05D 1/0257
See application file for complete search history.

(56) References Cited

U.S. PATENT DOCUMENTS 11,209,545 B2  12/2021 Lin et al.
2021/0003709 A1* 1/2021 Lin .......................... G01S 7/497

FOREIGN PATENT DOCUMENTS

| CN | 104991557 | | 10/2015 |
| CN | 104991557 A | * | 10/2015 |
| CN | 107505940 | | 12/2017 |
| JP | 2017123065 A | * | 7/2017 |
| TW | 202102818 | | 1/2021 |

* cited by examiner

Primary Examiner — Vivek D Koppikar
Assistant Examiner — Jeffrey R Chalhoub
(74) Attorney, Agent, or Firm — JCIPRNET

(57) ABSTRACT

A moving vehicle and a positioning method used for moving vehicle are provided. In the method, a difference between the first distance and the second distance is determined. The first distance is based on the detection result of the first detection signal, the second distance is based on the detection result of the second detection signal. The traveling route is determined according to the difference between the first distance and the second distance. The moving vehicle moves according to the traveling route.

14 Claims, 14 Drawing Sheets

MOVING VEHICLE AND POSITIONING METHOD USED FOR MOVING VEHICLE

CROSS-REFERENCE TO RELATED APPLICATION

This application claims the priority benefit of Taiwan application serial no. 112126029 filed on Jul. 12, 2023. The entirety of the above-mentioned patent application is hereby incorporated by reference herein and made a part of this specification.

BACKGROUND

Technical Field

The disclosure relates to an autonomous mobile control, an in particular relates to a moving vehicle and a positioning method used for moving vehicle.

Description of Related Art

At present, an autonomous vehicle system uses three-dimensional (3D) simultaneous localization and mapping (SLAM) or track system to achieve autonomous movement. Some autonomous vehicle systems also use cameras to identify markers for secondary positioning and docking operations to reach charging docks or other designated locations. However, the image captured by the camera is easily distorted by the influence of the ambient light source, which may result in positioning or docking failure.

SUMMARY

A moving vehicle and a positioning method used for moving vehicle, which may improve the chance of successful positioning, are provided in the disclosure.

A positioning method used for moving vehicle in the embodiment of the disclosure includes (but is not limited to) the following operation. A difference between a first distance and a second distance is determined. The first distance is based on a detection result of a first detection signal, and the second distance is based on a detection result of a second detection signal. A traveling route is determined according to the difference between the first distance and the second distance. The moving vehicle moves according to the traveling route.

A moving vehicle according to the embodiment of the disclosure includes a moving mechanism, a distance detector, a storage, and a processor. The distance detector sends out a first detection signal and a second detection signal. The first detection signal and the second detection signal are sent along different transmission paths. The storage stores program code. The processor is coupled to the moving mechanism, the distance detector, and the storage. The processor loads the program code to execute the following operation. A difference between a first distance and a second distance is determined, and a traveling route is determined according to the difference between the first distance and the second distance. The first distance is based on a detection result of a first detection signal, and the second distance is based on a detection result of a second detection signal. The moving mechanism moves according to the traveling route.

Based on the above, the moving vehicle and the positioning method used for the moving vehicle according to the embodiments of the disclosure may send out two detection signals, and determine the traveling route that instructs the moving mechanism according to the difference between the detected distances of the two detection signals. In this way, the light source may be prevented from affecting the detection result, and the accuracy of positioning and docking may be improved.

In order to make the above-mentioned features and advantages of the disclosure comprehensible, embodiments accompanied with drawings are described in detail below.

DETAILED DESCRIPTION OF DISCLOSED EMBODIMENTS

Figure 1:
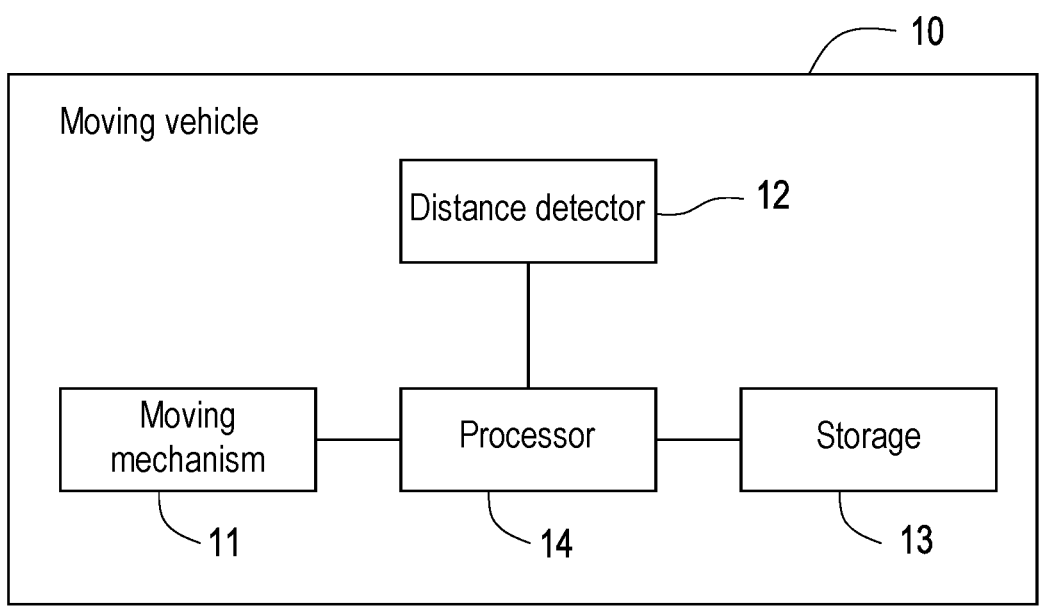
FIG. 1 is a block diagram of components of a moving vehicle according to an embodiment of the disclosure.

FIG. 1 is a block diagram of components of a moving vehicle 10 according to an embodiment of the disclosure. Referring to FIG. 1, the moving vehicle 10 includes (but not limited to) a moving mechanism 11, a distance detector 12, a storage 13, and a processor 14. The moving vehicle 10 may be an automated guided vehicle (AGV), an autonomous mobile robot (AMR), an unmanned/computer driven vehicle, a sweeping robot, or other moving devices.

The moving mechanism 11 may include a power unit (e.g., a motor or an engine), a transmission system (e.g., a transmission shaft or a transmission shaft), and driving wheels (e.g., wheels or tracks).

The wheels may be general circular wheels, omni-directional wheels, or any other form of wheels. The track may also be any form of track. In some embodiments, the moving mechanism 11 may also be a combination of wheels and tracks. The function of the moving mechanism 11 is to change the position or move by being driven by a power unit (e.g., a motor or an engine) that controls the movement of the wheels or tracks.

The distance detector 12 may be LiDAR, radar, a time of flight (ToF) sensor, or other sensors for distance measurement. In one embodiment, the distance detector 12 sends out one or more detection signals. Depending on the ranging technology, the detection signal may be a radio signal, a light signal, or an infrared light signal. In one embodiment, the detection result of the detection signal may be used to calculate the distance of (external) object or environment. For example, the detection signal is reflected by the object after it is sent from the distance detector 12, and the distance detector 12 or the processor 14 may estimate the distance according to the time interval between the arrival time of the reflected echo signal and the sending time of the detection signal. However, the estimation of the distance is not limited thereto.

Figure 2A:
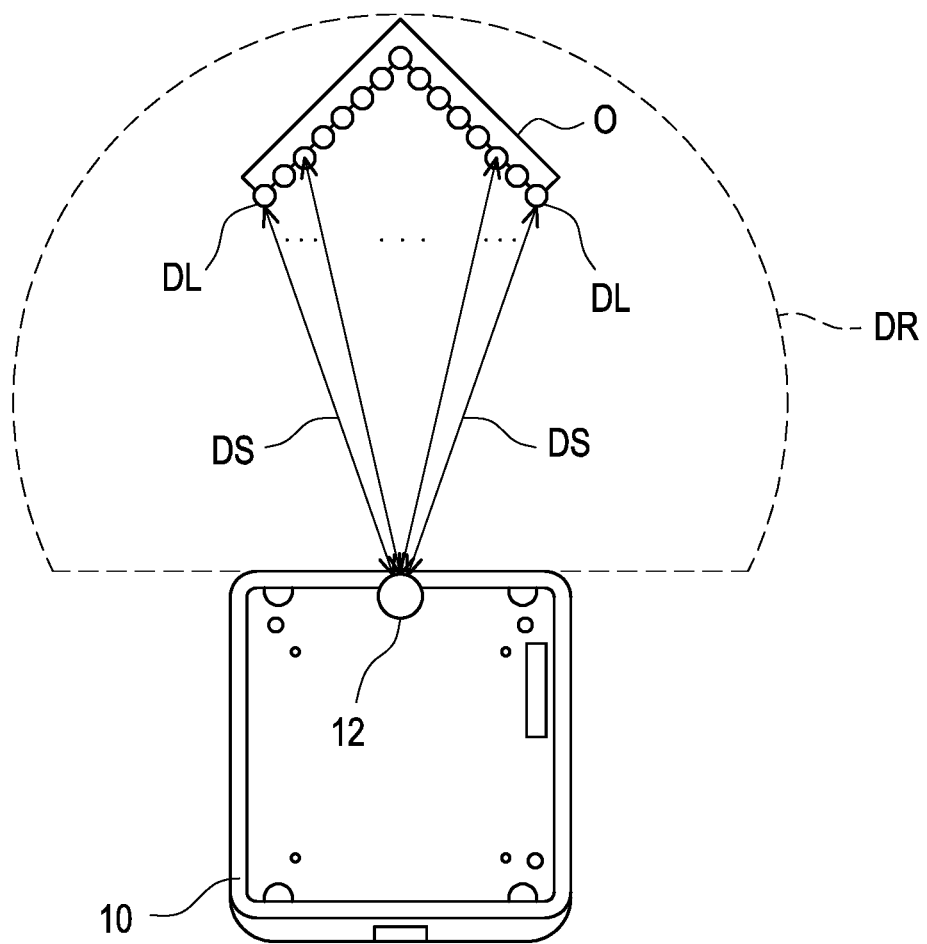
FIG. 2A and FIG. 2B are schematic diagrams of a ranging operation according to an embodiment of the disclosure.
Figure 2B:
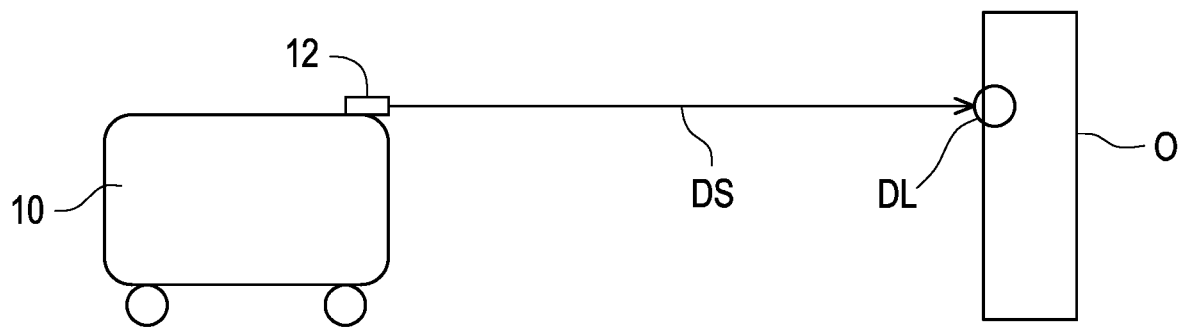

In one embodiment, multiple detection signals are sent along different transmission paths. FIG. 2A and FIG. 2B are schematic diagrams of a ranging operation according to an embodiment of the disclosure. Referring to FIG. 2A, the distance detector 12 may send multiple detection signals DS towards different angles. That is, the transmission paths of these detection signals DS are radial. Within the detection range DR of the detection signal DS (e.g., 1 meter, 1.5 meters, or 2 meters, but it may be different due to the capability of the distance detector 12), if the detection signal DS reaches the object O, a (virtual) detection point DL is formed and reflected by the object O to form an echo signal (i.e., the detection signal DS reflected by the object O). Each detection point DL corresponds to a position where a detection signal DS is projected onto the object O.

In another embodiment, the distance detector 12 sends multiple detection signals DS in a matrix form. That is, the transmission paths of the detection signals DS are parallel to each other, but these transmission paths may not overlap.

The storage 13 may be any type of fixed or movable random access memory (RAM), read only memory (ROM), flash memory, conventional hard disk drive (HDD), solid-state drive (SSD) or similar components. In one embodiment, the storage 13 is configured to store program codes, software modules, configurations, data or files (e.g., depth values, height values, or calculation values), which are described in detail in subsequent embodiments.

The processor 14 is coupled to the moving mechanism 11, the distance detector 12, and the storage 13. The processor 14 may be a central processing unit (CPU), a graphics processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, or other similar components, or combinations of components thereof. In one embodiment, the processor 14 is used to execute all or some of the operations of the moving vehicle 10, and may load and execute various program codes, software modules, files, and data stored in the storage 13.

Hereinafter, the method according to the embodiment of the disclosure is described in conjunction with various mechanisms, components, and modules in the moving vehicle 10. Each process of the method may be adjusted according to the implementation, and is not limited to thereto.

Figure 3:
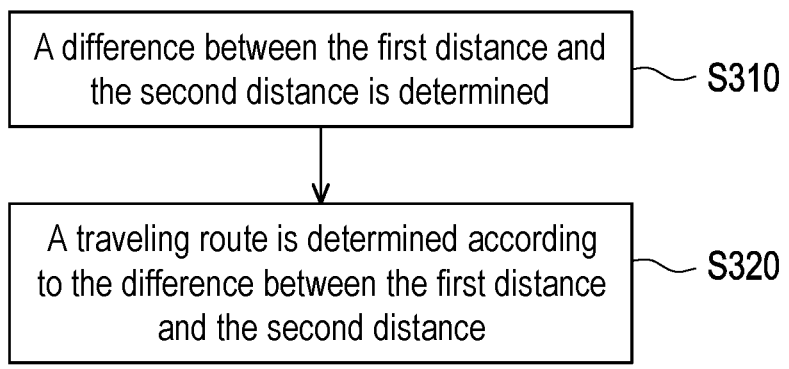
FIG. 3 is a flowchart of a positioning method according to an embodiment of the disclosure.
Figure 4:
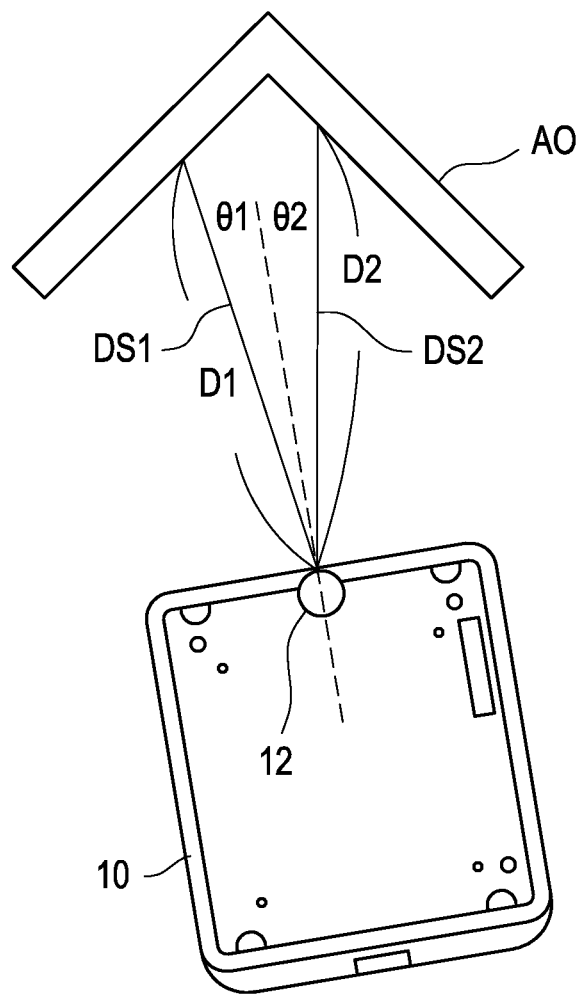
FIG. 4 is a schematic diagram of distance comparison according to an embodiment of the disclosure.

FIG. 3 is a flowchart of a positioning method according to an embodiment of the disclosure. Referring to FIG. 3, the processor 14 determines the difference between the first distance and the second distance (step S310). Specifically, FIG. 4 is a schematic diagram of distance comparison according to an embodiment of the disclosure. Please refer to FIG. 4, the first detection signal DS1 and the second detection signal DS2 are sent along different transmission paths. FIG. 4 takes a radial emission detection signal as an example. The first detection signal DS1 and the second detection signal DS2 are sent from different angles. Taking the perpendicular bisector line (as shown in the dashed line) of the body of the moving vehicle 10 as a reference, the distance detector 12 (offsets to the left of the drawing and) sends out a first detection signal DS1 toward an angle θ1, and (offsets to the right of the drawing and) sends out a second detection signal DS2 toward an angle θ2. The angle θ1 may be equal to the angle θ2, for example, 5 degrees, 8 degrees, or 10 degrees, but not limited thereto. The first distance D1 is based on the detection result of the first detection signal DS1, and the second distance D2 is based on the detection result of the second detection signal DS2. The detection result is, for example, the round-trip time of the detection signal. The difference between the first distance D1 and the second distance D2 may be obtained by calculating the difference between the first distance D1 and the second distance D2.

Referring to FIG. 3, the processor 14 determines a traveling route according to the difference between the first distance and the second distance (step S320). Specifically, the traveling route is used to instruct the movement of the moving mechanism 11 of the moving vehicle 10. For example, the processor 14 may generate a control command according to the determined traveling route, so that the moving mechanism 11 may move forward, backward, rotate, accelerate, decelerate, and/or stop according to the control command.

It should be noted that the embodiment of the disclosure guides the orientation and target position through external auxiliary objects. As shown in FIG. 4, in a top view, the auxiliary object AO is in an inverted V shape. The inverted V shape is, for example, formed by two upright rectangular plates (forming two line segments in a top view), and one side of the two rectangular plates is connected to each other (forming a corner point in a top view). The material of the auxiliary object AO may be selected to be suitable for the normal reflection of the detection signal. For example, it may be a plastic or metal component, but not limited thereto. The V-shaped notch may be used to guide the orientation and target position. It should be noted that, in other embodiments, the shape of the auxiliary object AO in a top view may also be a symmetrical W, a trapezoid, or other symmetrical shapes formed by connecting multiple straight lines.

In one embodiment, the auxiliary object AO has a symmetrical shape. As shown in FIG. 4, if there is no difference between the first distance D1 and the second distance D2, it means that the distance detector 12 is facing the center of the auxiliary object AO (for example, the intersection of the endpoints of two line segments in a top view, that is, the corner point). On the contrary, if there is a difference between the first distance D1 and the second distance D2, it means that the distance detector 12 is not facing the center of the auxiliary object AO, and the orientation of the moving vehicle 10 may need to be further changed, that is, turned/rotated.

In one embodiment, considering the error of the distance detector 12, the processor 14 may define a difference tolerance value. For example, the difference tolerance value may be 1, 3, or 5 cm. In response to the difference between the first distance D1 and the second distance D2 not being less than the difference tolerance value, the processor 14 may determine that the traveling route includes a turning route. The turning path may be a rotation in place, or a combination of rotation and forward/backward movement. That is to say, the processor 14 may generate a control command according to the turning route, and the moving mechanism 11 may rotate in place or rotate and move according to the control command. On the other hand, in response to the difference between the first distance D1 and the second distance D2 being less than the difference tolerance value, the processor 14 may determine that the traveling route does not include a turning route or or prohibits generating a turning route. At this time, the traveling route may be to stop, or go straight forward/backward.

Figure 5A:
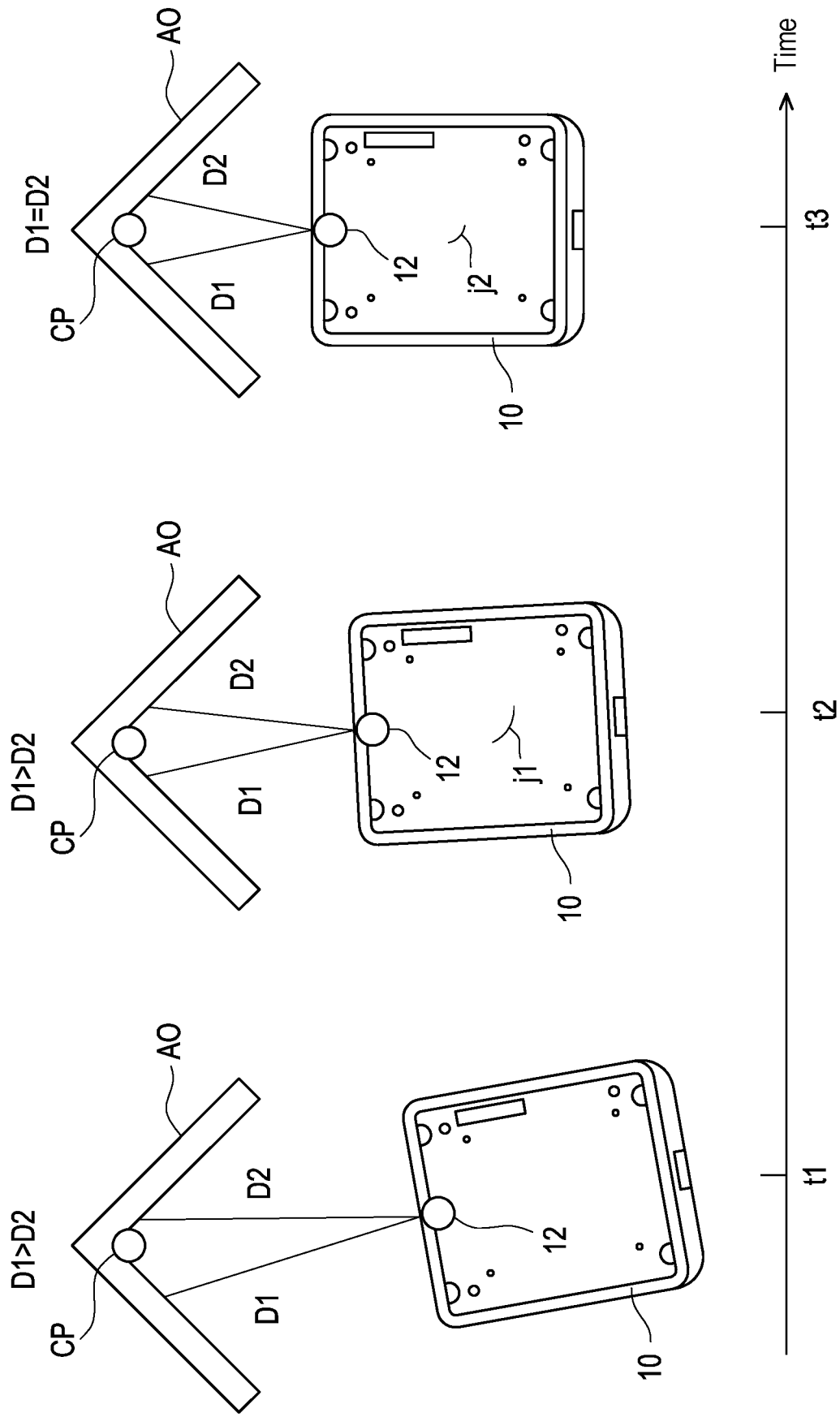
FIG. 5A and FIG. 5B are schematic diagrams illustrating comparison and moving routes according to an embodiment of the disclosure.
Figure 5B:
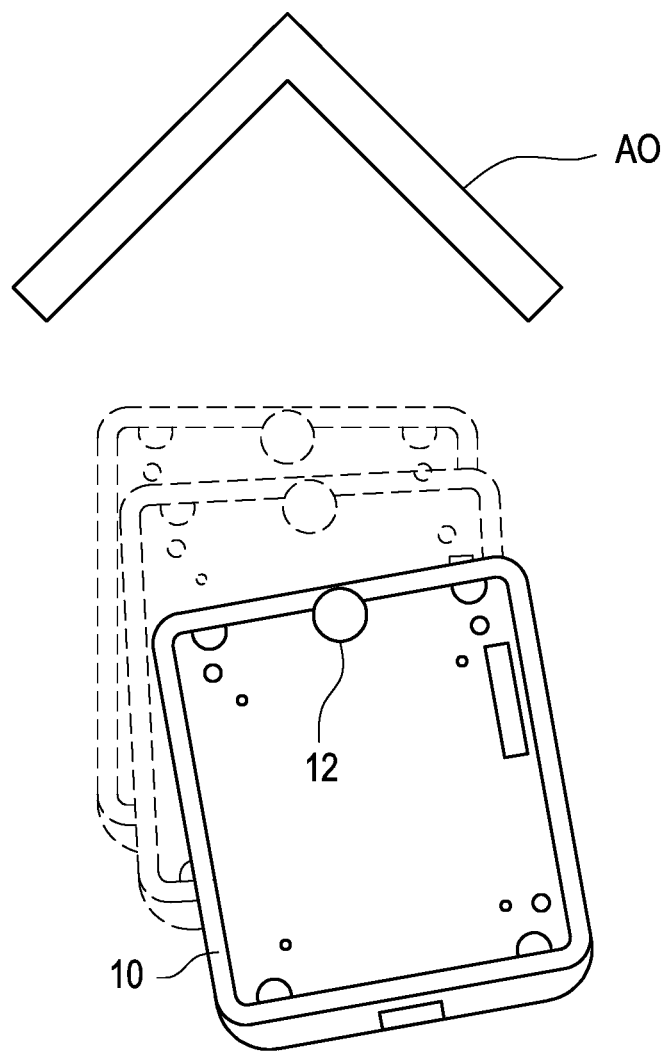

For example, FIG. 5A and FIG. 5B are schematic diagrams illustrating comparison and moving routes according to an embodiment of the disclosure. Referring to FIG. 5A, at the time point t1, the first distance D1 is greater than the second distance D2. The processor 14 determines that the turning route j1 includes turning clockwise or rightward by a specific angle (e.g., 3 or 5 degrees) and moving forward, and arriving at the position shown at the time point t2. In the drawing, since the first detection signal corresponding to the first distance D1 is located at the second detection signal corresponding to the second distance D2, clockwise or rightward rotation helps to narrow the difference between the first distance D1 and the second distance D2. Similarly, if the first distance D1 is less than the second distance D2, the turning route may include turning counterclockwise or turning leftward by a specific angle (e.g., 3 or 5 degrees) and moving forward. At time t2, the first distance D1 is still greater than the second distance D2. The processor 14 determines that the turning route j2 includes turning clockwise or rightward by a specific angle and moving forward, and arriving at the position shown at the time point t3. At the time point t3, the first distance D1 is equal to the second distance D2. The processor 14 decides that the moving mechanism 11 may be stopped. Referring to FIG. 5B, FIG. 5B shows the continuous change of the position of the moving vehicle 10 at three time points t1 to t3 in FIG. 5A.

It is worth noting that although the auxiliary object AO is a shape composed of multiple linear line segments in a top view (e.g., two line segments in FIG. 5A), in some application scenarios, the distance detector 12 is too close to the auxiliary object AO and may misjudge the section adjacent to the corner point CP of the linear line segment (i.e., the intersection of the endpoints of the two linear line segments) as an arc. At this time, based on the symmetry of the shape of the auxiliary object AO in a top view, the orientation of the moving vehicle 10 relative to the auxiliary object AO may be determined according to the difference between the two distances detected by the two detection signals.

The aforementioned positioning method may be applied to a task of the moving vehicle 10. One of the purposes of this task is to move the moving vehicle 10 in front of the auxiliary object AO. For example, the task may be a charging mission, a carrying mission, or a scouting mission, but not limited thereto.

In one embodiment, the processor 14 may recognize the auxiliary object according to multiple third detection signals, and these third detection signals are sent along different transmission paths. As shown in FIG. 2A, multiple detection signals DS (i.e., the third detection signals) are projected onto the object O, and the positions of these detection points DL or the distances between these detection points DL relative to the moving vehicle 10 may be used to determine whether the object O is an auxiliary object.

Figure 6:
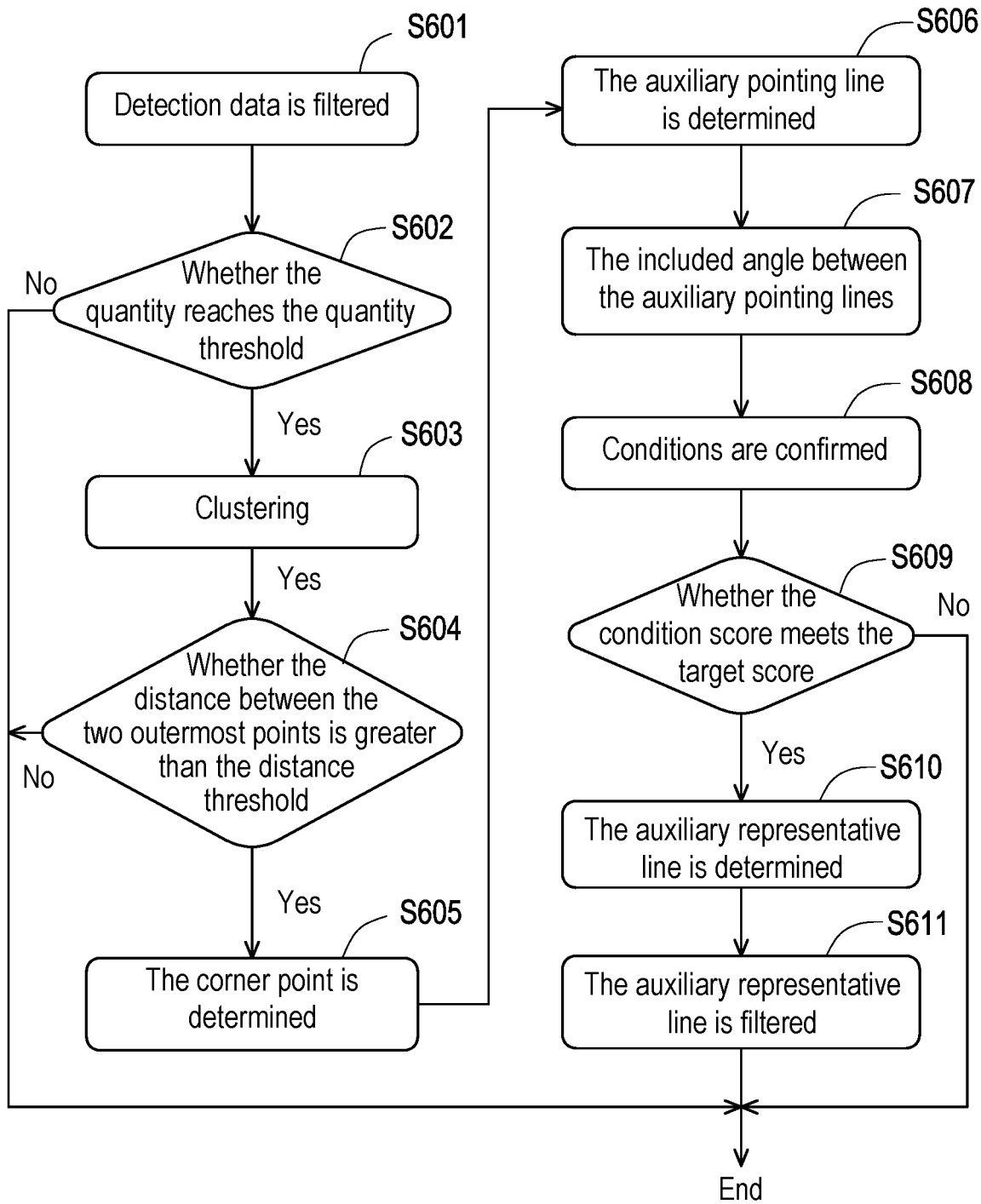
FIG. 6 is a flowchart of recognizing auxiliary objects according to an embodiment of the disclosure.

FIG. 6 is a flowchart of recognizing auxiliary objects according to an embodiment of the disclosure. Referring to FIG. 6, the processor 14 obtains the detection data of the distance detector 12 and filters the detection data (step S601). The detection data includes the position, distance, or depth of the initial detection points (e.g., the detection points DL shown in FIG. 2A) corresponding to multiple third detection signals (e.g., the detection signals DS shown in FIG. 2A). Each initial detection point corresponds to a position where a third detection signal is projected onto the auxiliary object. The processor 14 may retain initial detection points within a set distance in the detection data. The set distance is, for example, 2 meters, 3 meters, or other values, and may be changed according to task characteristics or the capability of the distance detector 12. The processor 14 may ignore or delete initial detection points and their distances/depths in the detection data which are outside the set distance.

The processor 14 may determine whether the number of initial detection points retained in step S601 reaches a quantity threshold (step S602). The quantity threshold is, for example, 30, 40, or 50, and may vary depending on task characteristics or the capability of the distance detector 12.

In response to the number of retained initial detection points not reaching the quantity threshold, the task ends or returns to step S601. In response to the number of retained initial detection points reaching or exceeding the number threshold, the processor 14 may cluster multiple initial detection points (step S603). Initial detection points with similar distances form a cluster. The detection points used for subsequent recognition (i.e., a part or all of the initial detection points) belong to the same cluster, and the distance between any detection point in the same cluster and other detection points in other clusters is greater than a reference distance. For example, the processor 14 may define a reference distance (e.g., 1, 5, or 10 mm) according to the size of the auxiliary object (e.g., the maximum length in a top view), and the distance between any two detection points in the same cluster is less than the reference distance. If the distance between the detection point and another detection point is greater than the reference distance, then the two detection points belong to different clusters. In some embodiments, the processor 14 may cluster the initial detection points by such as K-means, K-nearest-neighbors (KNN), hierarchical clustering, or other clustering algorithms. A cluster of those detection points may be regarded as detection of an object, for example, auxiliary objects, obstacles, or walls.

In one embodiment, the processor 14 may determine the scanning shape according to the detection points corresponding to the third detection signals, and recognize the auxiliary object according to the comparison result of the scanning shape and the auxiliary object. Multiple detection points in a cluster correspond to an object. By comparing the shape formed by the connection of these detection points (i.e., the scanning shape) with the shape of the auxiliary object, it may be determined whether the object corresponding to the cluster is an auxiliary object. The scanning shape may be defined by the distance of the detection points, the included angle between the connecting lines, or other geometric properties. The comparison result may be whether the distance, included angle, or quantity meets the shape of the auxiliary object.

Figure 7A:
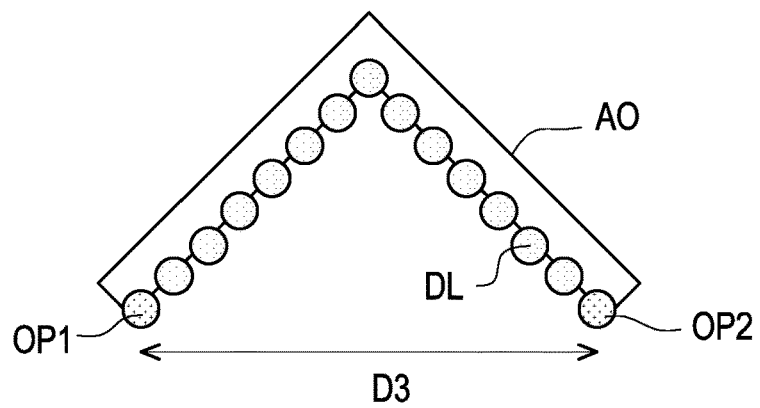
FIG. 7A is a schematic diagram illustrating an endpoint distance according to an embodiment of the disclosure.

The processor 14 may determine whether the distance between two outermost points in a certain cluster satisfies a distance threshold (step S604). FIG. 7A is a schematic diagram illustrating an endpoint distance according to an embodiment of the disclosure. Referring to FIG. 7A, the two outermost points OP1 and OP2 are the two farthest detection points DL in a cluster. The outermost points OP1 and OP2 are respectively located at the left and right ends of the auxiliary object AO, that is, they are the outermost detection points DL. The processor 14 may define a distance threshold according to the size of the auxiliary object AO (e.g., the maximum length in a top view), and the third distance D3 between the two outermost points OP1 and OP2 in the scanning shape is equal to the distance threshold or the difference from the distance threshold is within a tolerable range. That is, the auxiliary object AO is detected based on these detection points DL. For example, if the actual distance between the two outermost points of the auxiliary object AO in a top view is 10 cm, then the distance threshold value is 8.5 to 15 cm. If the third distance D3 is not equal to the distance threshold or the difference from the distance threshold is not within the tolerable range, then the detection points in the cluster do not correspond to the auxiliary object AO (i.e., other objects).

Figure 7B:
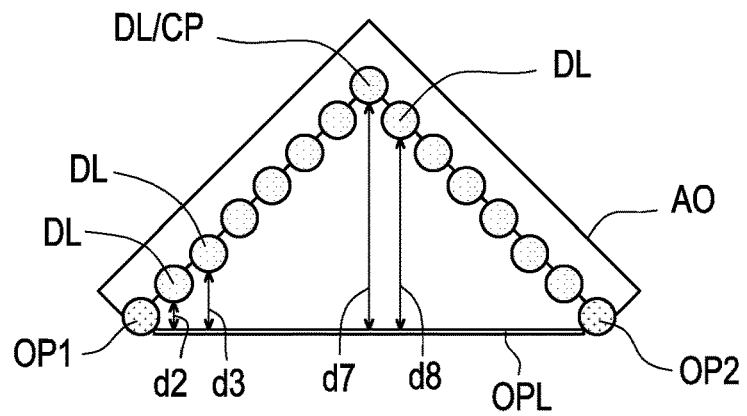
FIG. 7B is a schematic diagram illustrating selection of a corner point according to an embodiment of the disclosure.

In response to the third distance D3 not meeting the distance threshold, the task ends or returns to step S601. In response to the third distance D3 meeting the distance threshold, the processor 14 may recognize the corner point of those detection points in the cluster (step S605). FIG. 7B is a schematic diagram illustrating selection of a corner point according to an embodiment of the disclosure. Referring to FIG. 7B, the processor 14 may use one of the multiple detection points DL that is farthest from a connecting line OPL between the two outermost points OP1 and OP2 of the detection points DL as the corner point CP. For example, the processor 14 respectively calculates the linear distance or the shortest distance from each detection point DL to the connecting line OPL.

In one embodiment, as shown in FIG. 7B, the processor 14 regards the maximum linear distance from each detection point DL to the connecting line OPL as the corner point CP. Since the distance d7 from the detection point CP to the connecting line OPL is greater than the distance from other detection points DL to the OPL (e.g., distance d2, d3, or d8), the processor 14 regards the detection point CP as the corner point. The processor 14 may split the line into two line segments according to the corner point CP. As shown in FIG. 7B, the detection points DL on the left side of the corner point CP form a line segment, and the detection points DL on the right side of the corner point CP form another line segment.

Figure 7C:
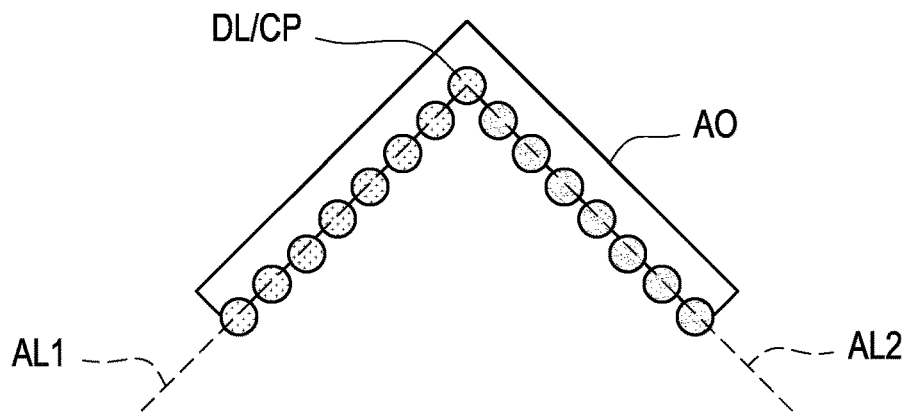
FIG. 7C is a schematic diagram illustrating determination of auxiliary pointing lines according to an embodiment of the disclosure.

Referring to FIG. 6, the processor 14 may determine two auxiliary pointing lines according to the determined corner point (step S606). FIG. 7C is a schematic diagram illustrating determination of auxiliary pointing lines AL1 and AL2 according to an embodiment of the disclosure. Referring to FIG. 7C, the auxiliary pointing lines AL1 and AL2 are imaginary lines extending from the corner point CP along the detection points DL on both sides of the corner point CP. Due to the symmetry of the auxiliary object AO in a top view, the two auxiliary pointing lines AL1 and AL2 correspond to the line segment formed by the detection points DL on the left side of the corner point CP in FIG. 7B and the line segment formed by the detection points DL on the right side of the corner point CP in FIG. 7B. In one embodiment, the processor 14 may determine the connecting line of the detection points DL as one of the two auxiliary pointing lines AL1 and AL2 through linear regression. Thereby, the two auxiliary pointing lines AL1 and AL2 in the scanning shape corresponding to the detection point CL may be recognized.

It may be known that the processor 14 may recognize the corner point CP between the two auxiliary pointing lines AL1 and AL2 according to the positions of multiple detection points DL, such as the description of step S605, which is not repeated herein. Furthermore, this corner point CP is located at the intersection of the endpoints of the two auxiliary pointing lines AL1 and AL2.

Figure 7D:
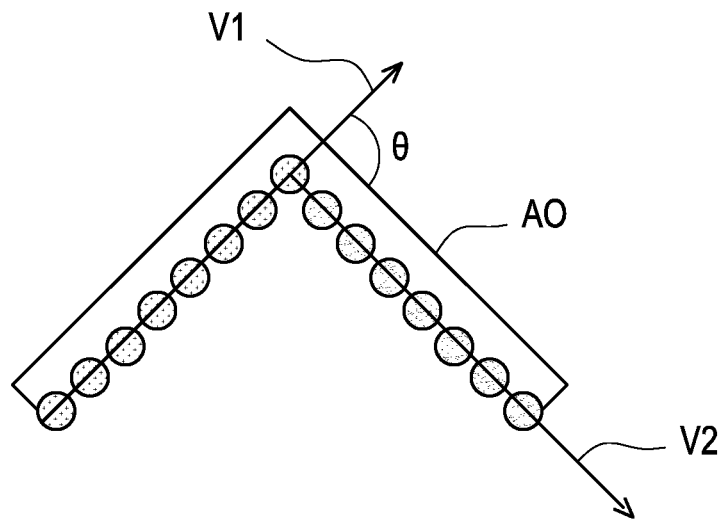
FIG. 7D is a schematic diagram illustrating determination of an included angle between two auxiliary pointing lines according to an embodiment of the disclosure.

Referring to FIG. 6, the processor 14 may determine the included angle between the two auxiliary pointing lines AL1 and AL2 (step S607). FIG. 7D is a schematic diagram illustrating determination of an included angle θ between two auxiliary pointing lines AL1 and AL2 according to an embodiment of the disclosure. Referring to FIG. 7D, the two auxiliary pointing lines AL1 and AL2 in FIG. 7C respectively correspond to the vectors V1 and V2. For example, the processor 14 may generate the vectors V1 and V2 respectively according to two endpoints of any set of detection points DL on the left and right sides of the corner point CP. For example, the processor 14 may determine the included angle θ between the two vectors V1 and V2 through cross product, and use it as the included angle θ between the two auxiliary pointing lines AL1 and AL2.

Referring to FIG. 6, the processor 14 confirms whether the scanning shape corresponding to the detection point meets the geometric condition of the shape of the auxiliary object (step S608). In one embodiment, the processor 14 may recognize two auxiliary pointing lines in the scanning shape (as described in step S606). The processor 14 determines whether the number of auxiliary pointing lines in the cluster matches the number of the line segments in the shape of the auxiliary object (i.e., the comparison result of the scanning shape and the auxiliary object). Taking FIG. 7C as an example, whether there are two auxiliary pointing lines is confirmed. That is, the number of the line segments in the shape of the auxiliary object is two.

In one embodiment, the processor 14 may compare the lengths of the two auxiliary pointing lines in the scanning shape with the lengths of the two line segments in the shape of the auxiliary object. The processor 14 may determine whether the lengths of the two auxiliary pointing lines are equal to the lengths of the two line segments in the shape of the auxiliary object (i.e., the comparison result of the scanning shape and the auxiliary object).

In one embodiment, the processor 14 may compare the included angle between the two auxiliary pointing lines in the scanning shape with the included angle between the two line segments in the shape of the auxiliary object. The processor 14 may determine whether the included angle between the two auxiliary pointing lines is equal to the included angle between the two line segments in the shape of the auxiliary object (i.e., the comparison result of the scanning shape and the auxiliary object).

Referring to FIG. 6, the processor 14 may determine whether the condition score meets the target score (step S609). If the comparison results of the number of line segments, the length of the line segments, and the included angle matches the shape of the auxiliary object, the target score is increased by one point. The processor 14 may define the target score as 3 points. That is, the comparison results of the aforementioned number, length, and included angle all match the shape of the auxiliary object in order for the auxiliary object to be recognized.

It should be noted that the recognition of the aforementioned auxiliary object is an example of the inverted V-shaped auxiliary object AO shown in FIG. 7A. However, the shape recognition of other auxiliary objects with different shapes in a top view may still be changed according to actual requirements. For example, an inverted W-shape includes four line segments.

Figure 7E:
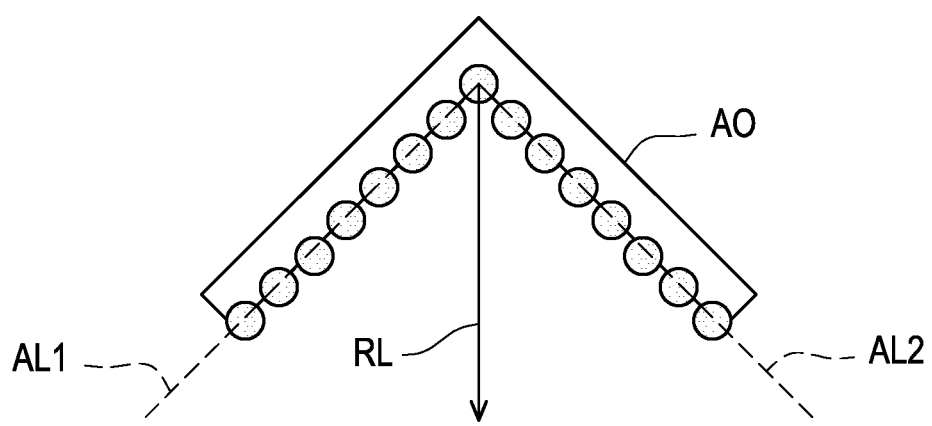
FIG. 7E is a schematic diagram illustrating determination of an auxiliary representative line according to an embodiment of the disclosure.

Referring to FIG. 6, the processor 14 may determine an auxiliary representative line according to the shape of the auxiliary object (step S610). FIG. 7E is a schematic diagram illustrating determination of an auxiliary representative line RL according to an embodiment of the disclosure. Referring to FIG. 7E, the processor 14 may determine that the auxiliary representative line RL extends from the corner point CP in the shape of the auxiliary object AO. The shape of the auxiliary object AO includes two line segments (i.e., corresponding to the auxiliary pointing lines AL1 and AL2), the corner point CP is located at the intersection of the endpoints of the two line segments, and the auxiliary representative line RL is the symmetry axis of the shape of the auxiliary object. For example, the processor 14 determines the included angle of the notch of the shape of the auxiliary object AO in a top view according to the included angle determined in step S607, and the direction from one half of the included angle of the notch corresponds to the direction of the auxiliary representative line RL, thereby defining the auxiliary representative line RL. The auxiliary pointing lines AL1 and AL2 are symmetrical to the left and right according to the auxiliary representative line RL.

Referring to FIG. 6, if multiple auxiliary objects may be recognized in a piece of detection data, the processor 14 may further filter the auxiliary representative line (step S611). For example, the processor 14 selects the auxiliary representative line corresponding to the nearest auxiliary object of the moving vehicle 10.

Figure 8:
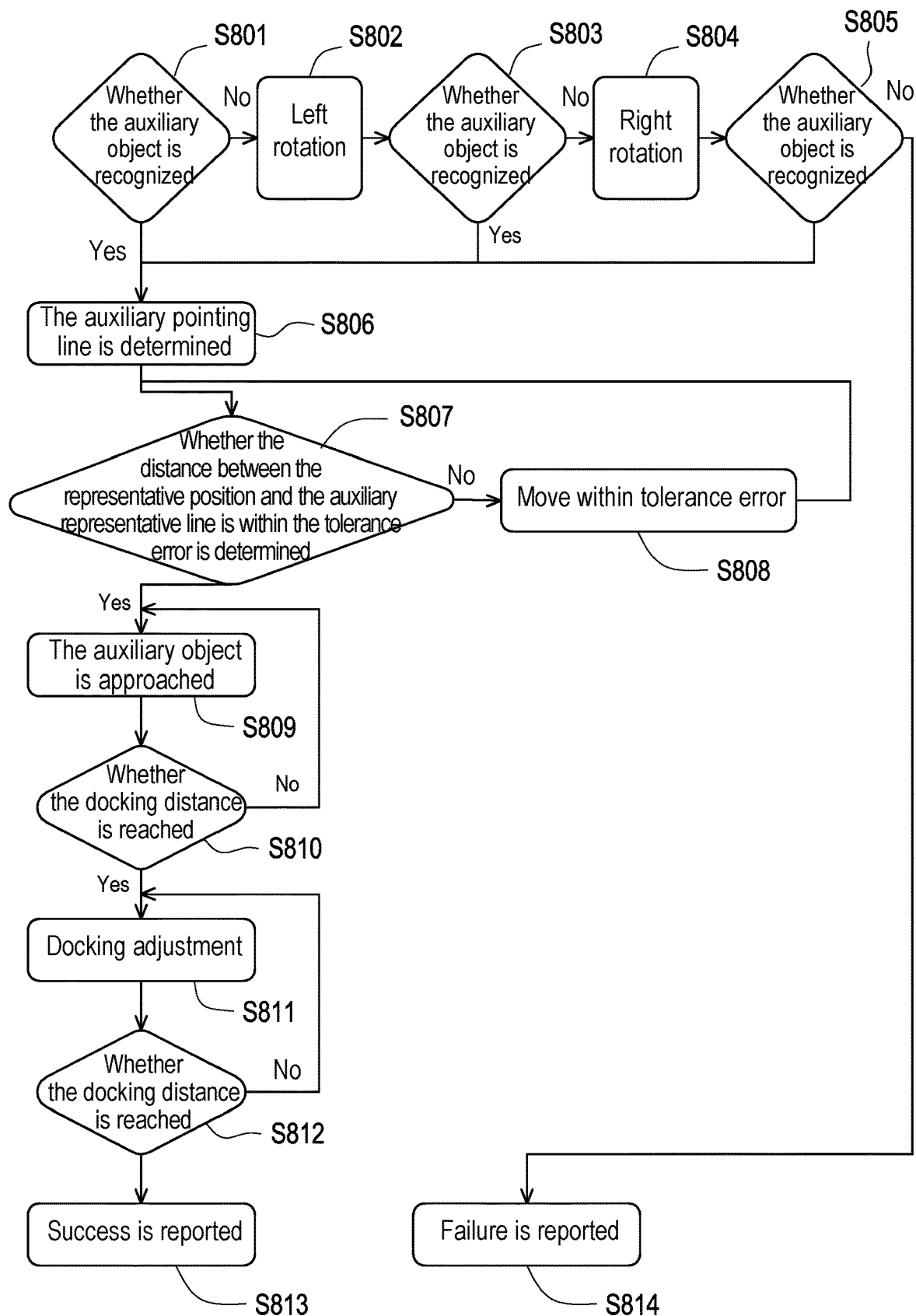
FIG. 8 is a flowchart of a docking operation according to an embodiment of the disclosure.

FIG. 8 is a flowchart of a docking operation according to an embodiment of the disclosure. Referring to FIG. 8, the processor 14 determines whether an auxiliary object is recognized (step S801). For the recognition of auxiliary objects, reference may be made to the descriptions of FIG. 6 to FIG. 7E, which are not repeated herein. In response to no auxiliary object being recognized, the processor 14 may control the moving mechanism 11 to rotate to the left (step S802). Next, the processor 14 determines whether an auxiliary object is recognized in the orientation during or after the rotation (step S803). In response to no auxiliary object being recognized, the processor 14 may control the moving mechanism 11 to rotate to the right (step S804). Next, the processor 14 determines whether an auxiliary object is recognized in the orientation during or after the rotation (step S805). In response to failure to recognize the auxiliary object, the processor 14 may end the task and report a task failure (step S814). For example, a warning message is provided through displays, speakers, or communication transceivers. It should be noted that the object searching method of first turning left and then right in step S801 to step S805 is just for illustration, and the embodiment of the disclosure does not limit the moving/turning process of the moving mechanism 11 in the object searching method.

In response to recognizing the auxiliary object, the processor 14 may determine an auxiliary representative line (step S806). For the determination of the auxiliary representative line, reference may be made to the descriptions of step S610 and FIG. 7E, which are not repeated herein.

Figure 9:
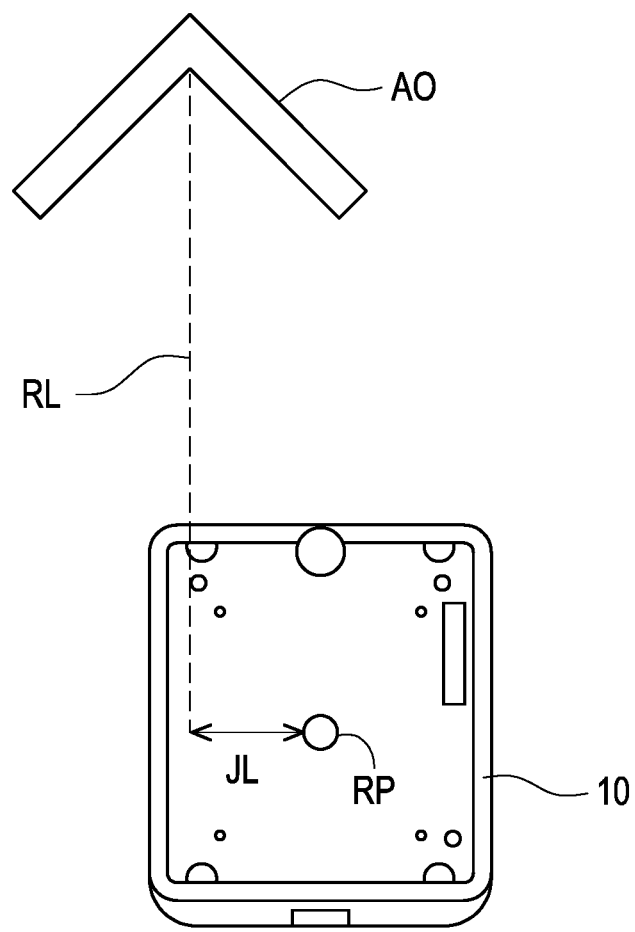
FIG. 9 is a schematic diagram illustrating alignment of auxiliary representative lines according to an embodiment of the disclosure.

Then, the processor 14 may determine the traveling route according to the distance between the representative position of the moving vehicle 10 and the auxiliary representative line. FIG. 9 is a schematic diagram illustrating alignment of auxiliary representative lines according to an embodiment of the disclosure. Referring to FIG. 9, the representative position RP of the moving vehicle 10 may be the center point of the moving vehicle 10 (but may also be the center of gravity or any position on its body). This auxiliary representative line RL is used to indicate the docking orientation. That is, it is an indication line indicating that the orientation of the moving vehicle 10 is aligned. In addition, the traveling route at this time is further used for reducing the distance JL. The smaller the distance JL is, the closer the representative position of the moving vehicle 10 is to the auxiliary representative line. The larger the distance JL is, the farther the representative position of the moving vehicle 10 is from the auxiliary representative line.

Specifically, the processor 14 may determine whether the distance between the representative position of the moving vehicle 10 and the auxiliary representative line is within a tolerance error (step S807). The processor 14 may define the tolerance error according to the capability or error of the distance detector 12. For example, if the distance between the moving vehicle 10 and the corner point of the auxiliary object AO is 80 cm, the tolerance error is 5 cm. In response to the distance between the representative position of the moving vehicle 10 and the auxiliary representative line not being within the tolerance error, the processor 14 may determine the traveling route as a route towards the auxiliary representative line, so that the distance between the representative position of the moving vehicle 10 and the auxiliary representative line is within the tolerance error (step S808). The traveling route may include turns, forwards, reverses, or combinations thereof.

In response to the distance between the representative position of the moving vehicle 10 and the auxiliary representative line being within the tolerance error, the processor 14 may continue to track the auxiliary object and control the moving mechanism 11 to approach the auxiliary object (step S809), for example, to go straight, but not limited thereto. It should be noted that step S809 may confirm that the first positioning is completed (i.e., the distance between the representative position and the auxiliary representative line is within the tolerance error). However, the current position of the moving vehicle 10 may not yet meet the docking requirements. The docking requirement may be a distance from an auxiliary object reaches a docking distance. The processor 14 may determine whether the moving vehicle 10 has reached the docking distance (step S810). That is, it is determined whether the distance between the moving vehicle 10 and the auxiliary object is equal to or less than the docking distance. The processor 14 may define the docking distance according to the shape and/or size of the auxiliary object. For example, the docking distance is 25, 35, or 50 cm.

In response to the moving vehicle 10 reaching the docking distance, the processor 14 may perform a docking adjustment (step S811). For the details of the docking adjustment, reference may be made to the descriptions of FIG. 3 to FIG. 5B, which are not repeated herein. That is, the orientation of the moving vehicle 10 is adjusted/corrected based on the distance reflected by the two detection signals, so that the orientation of the moving vehicle 10 is aligned with the corner point of the two line segments of the auxiliary representative line or the auxiliary object in a top view. In response to the moving vehicle 10 not reaching the docking distance, the processor 14 may continue to track the auxiliary object (return to step S809). Through the repeated tracking and distance confirmation from step S809 to step S811, the secondary positioning may be achieved, and the docking requirements may be met accordingly.

If there is movement during the docking adjustment process, the processor 14 may continue to determine whether the moving vehicle 10 has reached another docking distance (step S812). The other docking distance is shorter than the docking distance used in step S810, for example, 6, 8, or 10 cm. In response to the orientation of the moving vehicle 10 being aligned with the corner point of the two line segments of the auxiliary representative line or the auxiliary object in a top view, and reaching the other docking distance, the docking operation may be completed. In addition, the processor 14 may report task completion (step S813). For example, a prompt is provided through displays, speakers, or communication transceivers.

In one embodiment, the processor 14 may set the task trigger distance according to the application scenario. The influencing factors in the application scenario may be the size of the moving vehicle 10, the size of external objects and/or the surrounding environment.

Figure 10A:
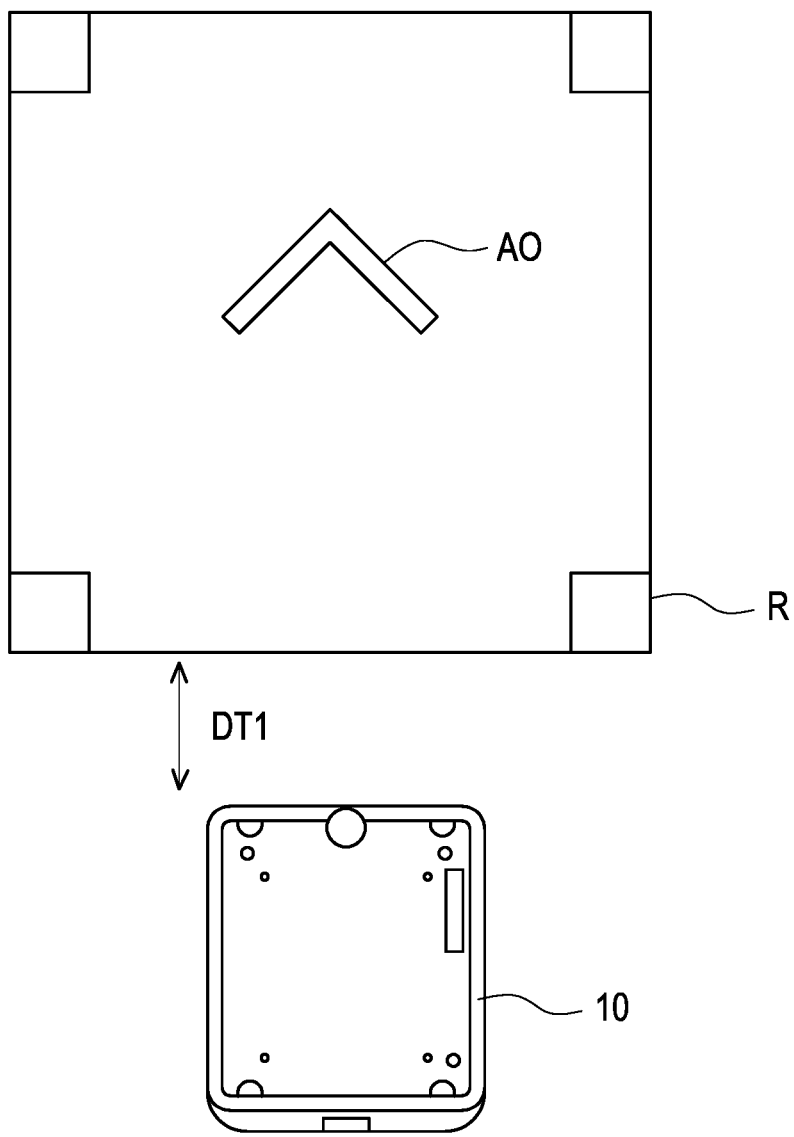
FIG. 10A illustrates a schematic diagram of setting a task trigger distance according to an embodiment of the disclosure.

For example, FIG. 10A illustrates a schematic diagram of setting a task trigger distance DT1 according to an embodiment of the disclosure. Referring to FIG. 10A, it is assumed that the auxiliary item AO is located under the shelf R. The bottom area of shelf R is 100 cm×100 cm. The task trigger distance DT1 may be a certain distance from the shelf R. For example, the distance may be 10, 20, or 25 cm, but not limited thereto.

Figure 10B:
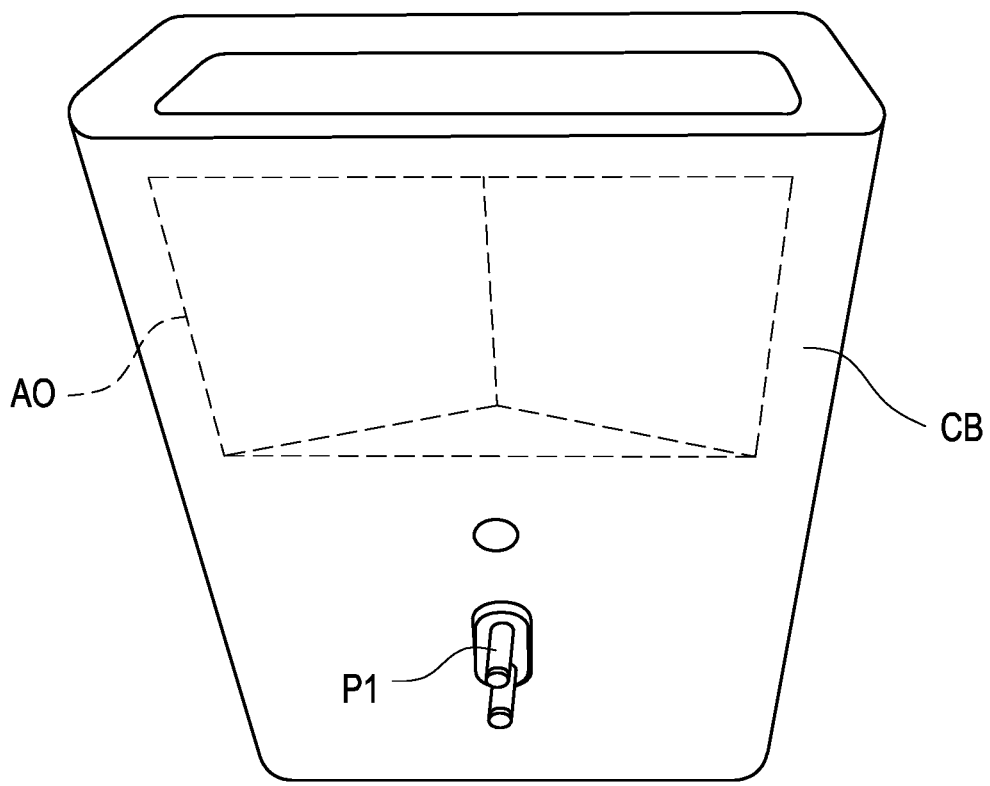
FIG. 10B is a schematic diagram illustrating a charging stand and an auxiliary object according to an embodiment of the disclosure.
Figure 10C:
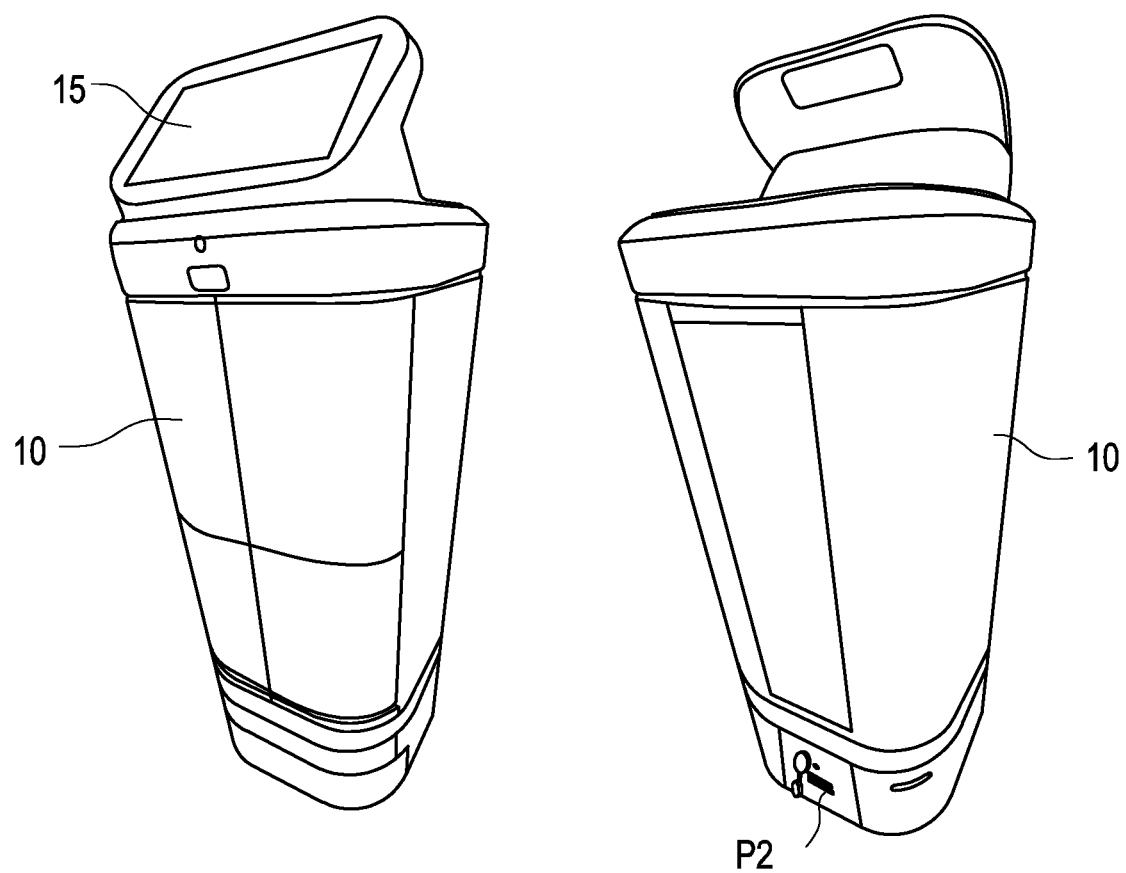
FIG. 10C is a schematic diagram of a moving vehicle according to an embodiment of the disclosure.

In some application scenarios, FIG. 10B is a schematic diagram illustrating a charging stand CB and an auxiliary object AO according to an embodiment of the disclosure. Referring to FIG. 10B, the charging stand CB is provided with an auxiliary object AO and a connector P1. The body of the charging stand CB is recessed to form a V-shaped auxiliary object AO. FIG. 10C is a schematic diagram of a moving vehicle 10 according to an embodiment of the disclosure. Referring to FIG. 10B and FIG. 10C, the moving vehicle 10 is provided with an electrode piece P2 for connecting with the connector P1. When performing the charging task, the moving vehicle 10 may recognize the auxiliary object AO to dock with the charging stand CB. After the docking is completed, the electrode piece P2 contacts the connector P1. The charging stand CB may charge the moving vehicle 10.

In some embodiments, the moving vehicle 10 further includes a display 15 (e.g., LCD, LED, or OLED display). According to different application scenarios (e.g., meal delivery, disinfection, reception, or advertisement), the display 15 may display table numbers, delivery contents, advertisement videos, guide messages, or other visual contents.

Figure 10D:
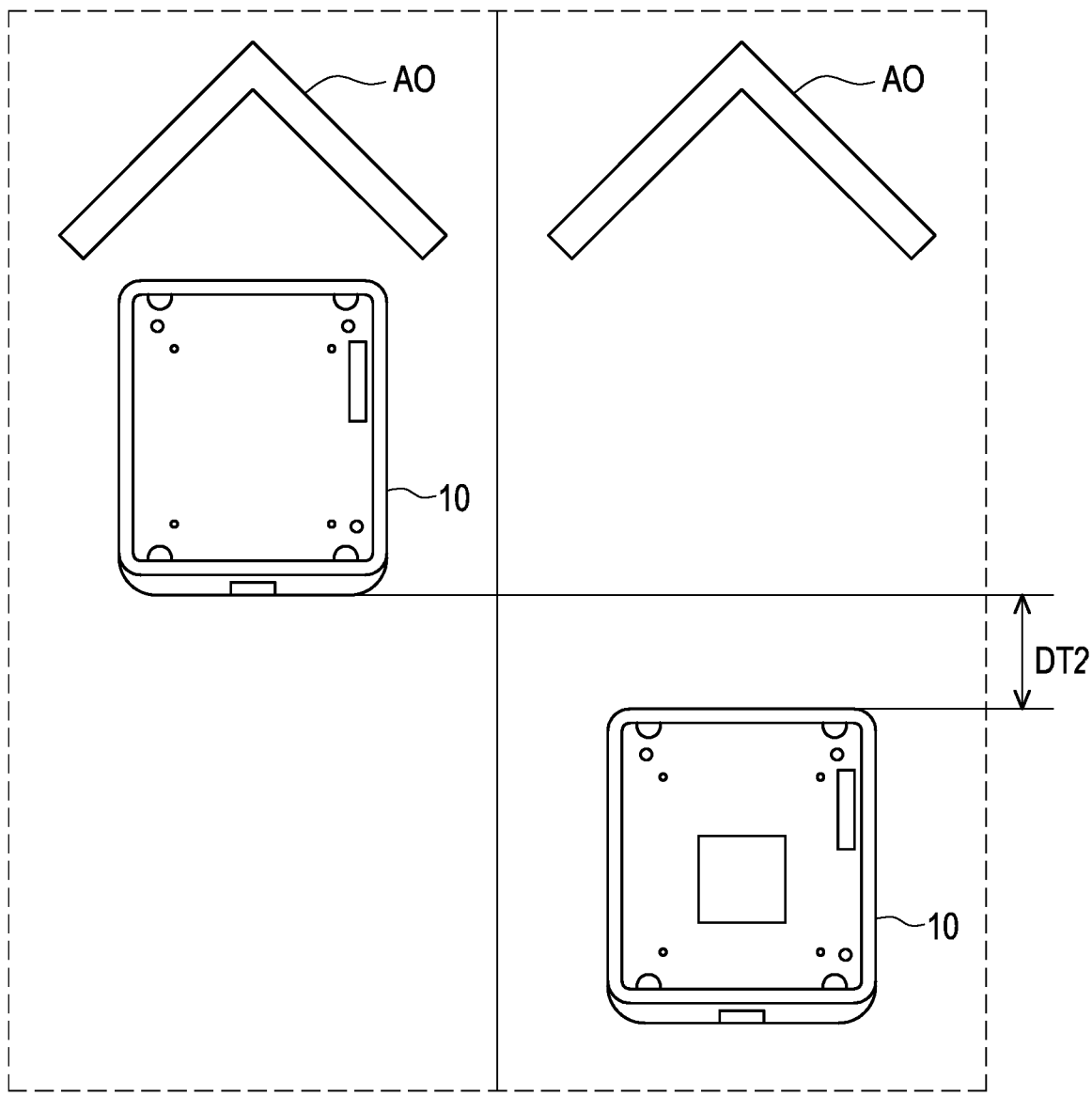
FIG. 10D is a schematic diagram illustrating setting a task trigger distance according to another embodiment of the disclosure.

As another example, FIG. 10D is a schematic diagram illustrating setting a task trigger distance DT2 according to another embodiment of the disclosure. Referring to FIG. 10D, the width of the auxiliary object AO is 50 cm. The task trigger distance DT2 may be a certain distance from the auxiliary object AO. For example, the distance may be 10, 20, or 25 cm, but not limited thereto.

To sum up, in the moving vehicle and the docking method used for the moving vehicle according to the embodiments of the disclosure, the orientation and distance are determined through the geometric features scanned by the distance detector, and the movement and/or rotation of the moving mechanism is controlled accordingly. Thereby, accurate positioning and docking may be achieved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A positioning method, suitable for a moving vehicle, the positioning method comprising:
   determining a difference between a first distance and a second distance, wherein the first distance is based on a detection result of a first detection signal, and the second distance is based on a detection result of a second detection signal;
   determining a traveling route according to the difference between the first distance and the second distance, wherein the moving vehicle moves according to the traveling route;
   determining the traveling route according to a distance between a representative position of the moving vehicle and an auxiliary representative line, wherein the auxiliary representative line is used to indicate a docking orientation, and the traveling route is further used to reduce the distance;
   recognizing an auxiliary object according to a plurality of third detection signals, wherein the third detection signals are sent along different transmission paths;
   determining the auxiliary representative line according to a shape of the auxiliary object, comprising:
      determining that the auxiliary representative line extends from a corner point in the shape of the auxiliary object, wherein the shape comprises two line segments, the corner point is located at an intersection of endpoints of the two line segments, and the auxiliary representative line is a symmetry axis of the shape of the auxiliary object; and
   generating a control command according to a determined traveling route, so that a moving mechanism of the moving vehicle moves forward, backward, rotate, accelerate, decelerate, and/or stop according to the control command.

2. The positioning method according to claim 1, wherein determining the traveling route according to the difference between the first distance and the second distance comprises:
   in response to the difference not being less than a difference tolerance value, determining that the traveling route comprises a turning route; and
   in response to the difference being less than the difference tolerance value, determining that the traveling route does not comprise the turning route.

3. The positioning method according to claim 1, wherein recognizing the auxiliary object according to the third detection signals comprises:
   determining a scanning shape according to a plurality of detection points corresponding to the third detection signals, wherein the detection points correspond to positions where the third detection signals are projected onto the auxiliary object; and
   recognizing the auxiliary object according to a comparison result of the scanning shape and the auxiliary object.

4. The positioning method according to claim 3, wherein recognizing the auxiliary object according to the comparison result of the scanning shape and the auxiliary object comprises:
   recognizing two auxiliary pointing lines in the scanning shape;
   comparing lengths of the two auxiliary pointing lines in the scanning shape with lengths of two line segments in the shape of the auxiliary object; and
   comparing an included angle between the two auxiliary pointing lines in the scanning shape with an included angle between the two line segments in the shape of the auxiliary object.

5. The positioning method according to claim 4, wherein recognizing the two auxiliary pointing lines in the scanning shape comprises:
   recognizing a corner point between the two auxiliary pointing lines according to positions of the detection points, wherein the corner point is located at an intersection of endpoints of the two auxiliary pointing lines; and
   determining the two auxiliary pointing lines according to the corner point.

6. The positioning method according to claim 5, wherein the step of recognizing the corner point comprises:
   taking one of the detection points that is farthest from a connecting line between two outermost points of the detection points as the corner point.

7. The positioning method according to claim 3, further comprising:
   clustering a plurality of initial detection points, wherein the initial detection points correspond to positions where the third detection signals are projected onto the auxiliary object, the detection points belong to a same cluster, and a distance between any one of the detection points in the same cluster and other detection points in other clusters is greater than a reference distance.

8. A moving vehicle, comprising:
   a moving mechanism;
   a distance detector, sending out a first detection signal and a second detection signal;
   a storage, storing program code; and
   a processor, coupled to the moving mechanism, the distance detector, and the storage, and loading the program code to execute:
   determining a difference between a first distance and a second distance, wherein the first distance is based on a detection result of the first detection signal, and the second distance is based on a detection result of the second detection signal;
   determining a traveling route according to the difference between the first distance and the second distance, wherein the moving mechanism moves according to the traveling route;
   determining the traveling route according to a distance between a representative position of the moving vehicle and an auxiliary representative line, wherein the auxiliary representative line is used to indicate a docking orientation, and the traveling route is further used to reduce the distance;
   recognizing an auxiliary object according to a plurality of third detection signals, wherein the third detection signals are sent along different transmission paths;
   determining the auxiliary representative line according to a shape of the auxiliary object, comprising:
   determining that the auxiliary representative line extends from a corner point in the shape of the auxiliary object, wherein the shape comprises two line segments, the corner point is located at an intersection of endpoints of the two line segments, and the auxiliary representative line is a symmetry axis of the shape of the auxiliary object; and
   generating a control command according to a determined traveling route, so that the moving mechanism moves forward, backward, rotate, accelerate, decelerate, and/or stop according to the control command.

9. The moving vehicle according to claim 8, wherein the processor further executes:
   in response to the difference not being less than a difference tolerance value, determining that the traveling route comprises a turning route; and
   in response to the difference being less than the difference tolerance value, determining that the traveling route does not comprise the turning route.

10. The moving vehicle according to claim 8, wherein the processor further executes:
    determining a scanning shape according to a plurality of detection points corresponding to the third detection signals, wherein the detection points correspond to positions where the third detection signals are projected onto the auxiliary object; and
    recognizing the auxiliary object according to a comparison result of the scanning shape and the auxiliary object.

11. The moving vehicle according to claim 10, wherein the processor further executes:
    recognizing two auxiliary pointing lines in the scanning shape;
    comparing lengths of the two auxiliary pointing lines in the scanning shape with lengths of two line segments in the shape of the auxiliary object; and
    comparing an included angle between the two auxiliary pointing lines in the scanning shape with an included angle between the two line segments in the shape of the auxiliary object.

12. The moving vehicle according to claim 11, wherein the processor further executes:
    recognizing a corner point between the two auxiliary pointing lines according to positions of the detection points, wherein the corner point is located at an intersection of endpoints of the two auxiliary pointing lines; and
    determining the two auxiliary pointing lines according to the corner point.

13. The moving vehicle according to claim 12, wherein the processor further executes:
    taking one of the detection points that is farthest from a connecting line between two outermost points of the detection points as the corner point.

14. The moving vehicle according to claim 10, wherein the processor further executes:
    clustering a plurality of initial detection points, wherein the initial detection points correspond to positions where the third detection signals are projected onto the auxiliary object, the detection points belong to a same cluster, and a distance between any one of the detection points in the same cluster and other detection points in other clusters is greater than a reference distance.

* * * * *